No. 759,417. PATENTED MAY 10, 1904.
J. M. BRASINGTON.
THRESHING MACHINE.
APPLICATION FILED SEPT. 17, 1902.
NO MODEL. 3 SHEETS—SHEET 1.

John M. Brasington, Inventor

Witnesses

By

Attorney

No. 759,417. PATENTED MAY 10, 1904.
J. M. BRASINGTON.
THRESHING MACHINE.
APPLICATION FILED SEPT. 17, 1902.
NO MODEL. 3 SHEETS—SHEET 2.

John M. Brasington, Inventor

Witnesses
By
Attorney

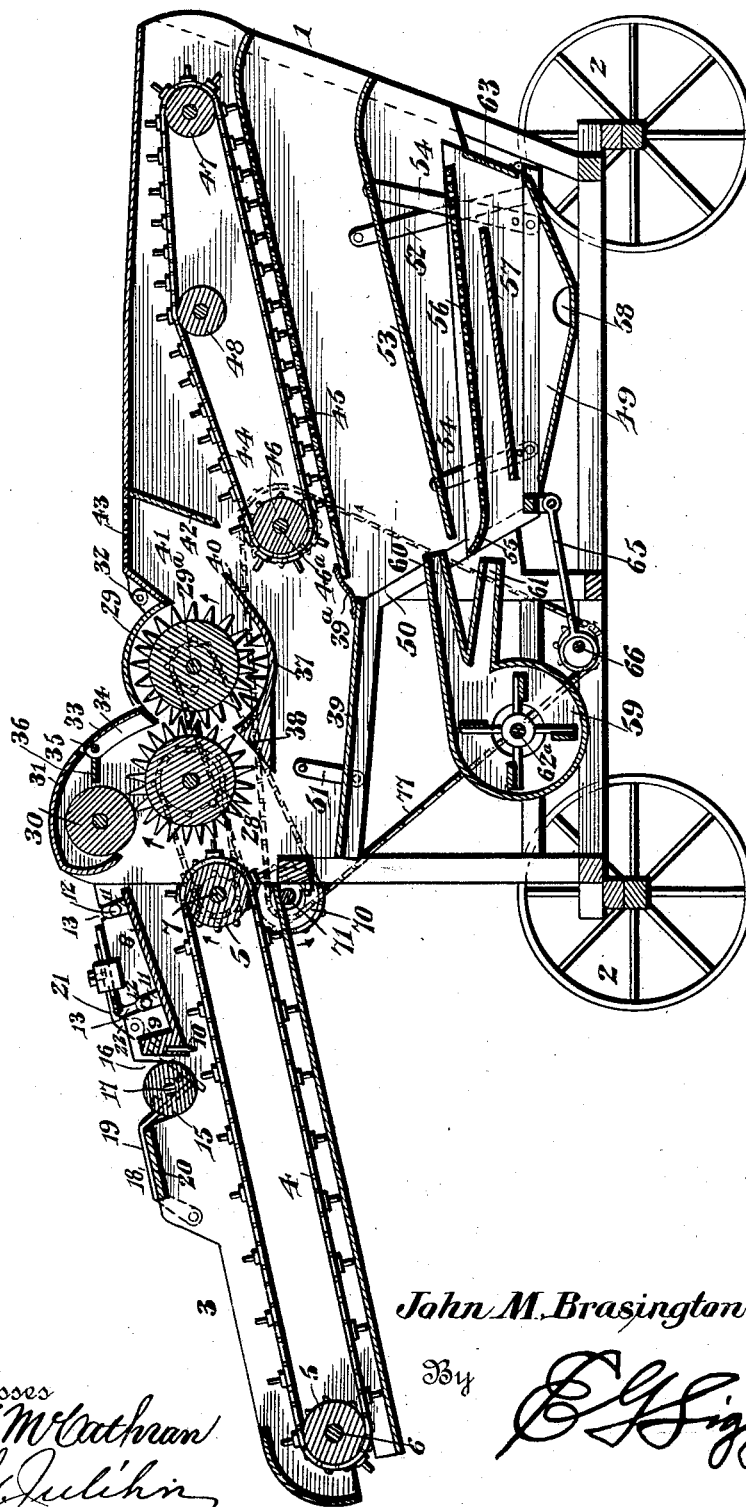

No. 759,417. Patented May 10, 1904.

UNITED STATES PATENT OFFICE.

JOHN MARION BRASINGTON, OF BENNETTSVILLE, SOUTH CAROLINA.

THRESHING-MACHINE.

SPECIFICATION forming part of Letters Patent No. 759,417, dated May 10, 1904.

Application filed September 17, 1902. Serial No. 123,719. (No model.)

*To all whom it may concern:*

Be it known that I, JOHN MARION BRASINGTON, a citizen of the United States, residing at Bennettsville, in the county of Marlboro and State of South Carolina, have invented a new and useful Threshing-Machine, of which the following is a specification.

My present invention relates to threshing-machines of the type illustrated in my concurrent application, Serial No. 77,470, for Letters Patent, and has special reference to certain improvements designed to render the machine more efficient for the threshing of peas and to render it capable of threshing corn just as it comes from the field without necessity for husking the ears or even separating the ears from the stalks.

The primary object of the invention may therefore be said to be the production of a threshing-machine capable of simultaneously husking and shelling corn and adapted to shred the stalks and husks, to disintegrate the cobs, and to separate the corn from the chaff.

Considered more specifically, the objects of the invention are to improve the feed by providing a novel feed-regulating device, to effect an initial separation of the corn, peas, or the like from the husks and stalks or vines, as the case may be, to separate the dust and lighter particles from the mass passing from the threshing mechanism, to present the initially-separated corn or peas and the mass of stalks or vines to a separating-screen through the medium of a carrier, and to subject the corn or peas and lighter debris dropping from the screen to the action of successive blasts of air before delivery to the shoe.

To the accomplishment of these objects and others subordinate thereto the invention in its preferred embodiment resides in the construction and arrangement of parts to be hereinafter described, illustrated in the accompanying drawings, and defined in the appended claims.

Figure 1:
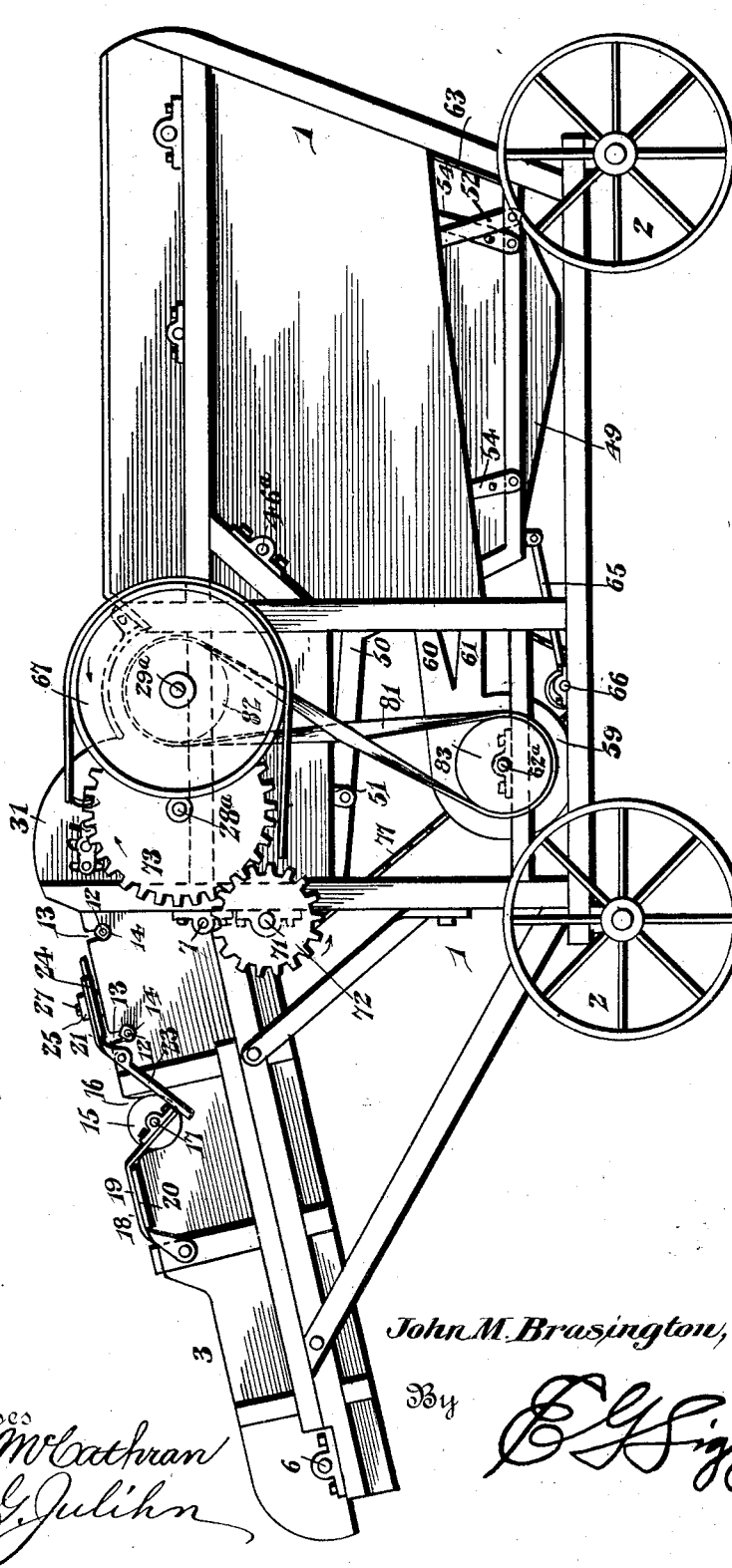
Figure 2:
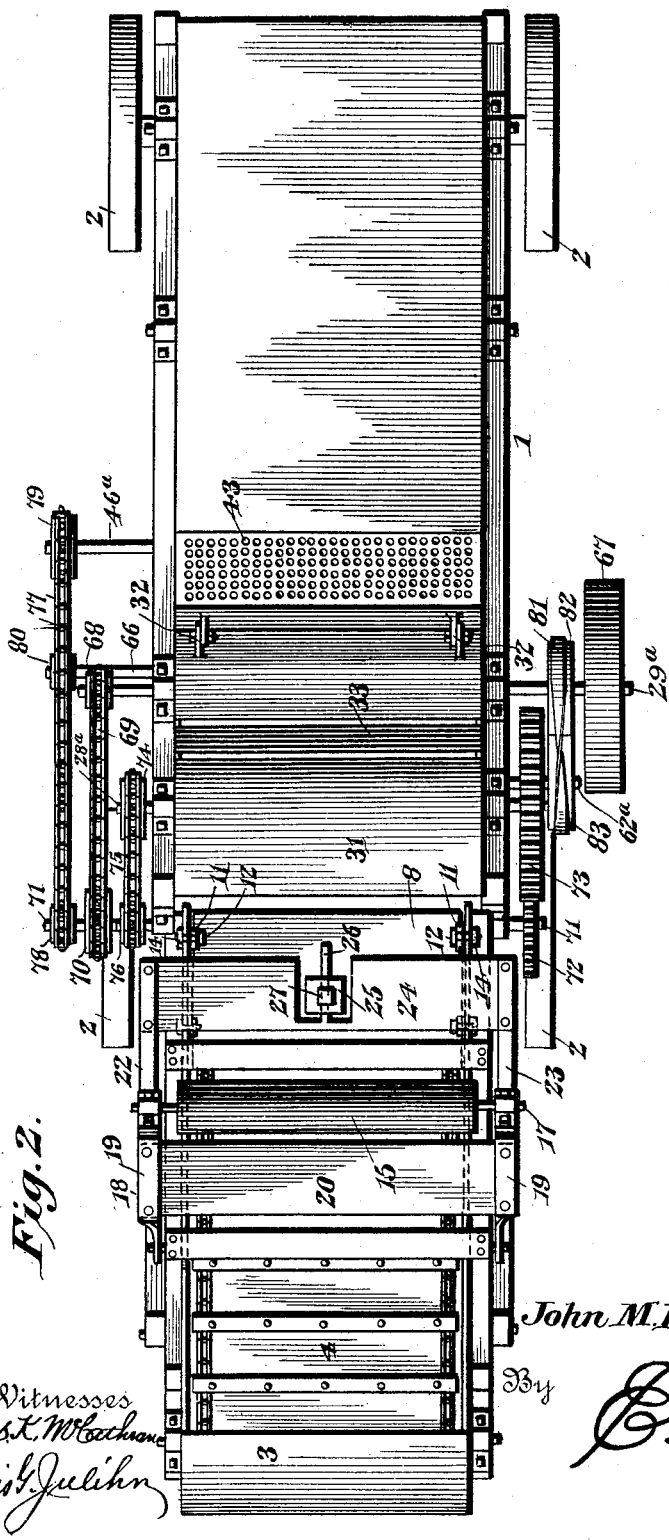
Figure 4:
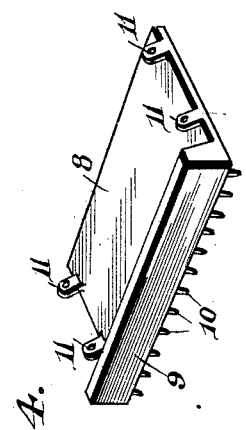

In said drawings, Figure 1 is a side elavation of my threshing-machine complete. Fig. 2 is a top plan view thereof. Fig. 3 is a longitudinal sectional view, and Fig. 4 is a detail perspective view of the feed-gage.

Like characters of reference are employed to designate corresponding parts throughout the views.

The machine comprises a suitable frame 1, carried by wheels 2 and having at its front end a forward extension 3 for the accommodation of the feeding mechanism. The primary element of the feeding mechanism is an endless feed-apron 4, carried around transverse rollers 5, mounted on shafts 6 and 7, journaled in the side walls of the frame extension 3. This apron is designed to carry the vines or corn, as the case may be, back to the threshing mechanism to be described, and the quantity of material thus conveyed is designed to be regulated by what may be termed a "feed-regulating" device, located above the apron 4 adjacent to its rear end.

This device includes as an element thereof a feed-gage 8, having the form of a plate, extending transversely across the extension 3 above the apron and provided at its front end with an upstanding flange 9 and a series of depending teeth 10. The material fed to the machine is carried by the apron 4 under the feed-gage 8, and it will thus be seen that the degree of separation between the apron and the plate will determine the quantity of material to be delivered to the threshing mechanism. In order, therefore, that this quantity may be varied, the feed gage or plate 8 is made vertically adjustable by providing it at its opposite sides with upstanding lugs 11 for the reception of securing-screws 12, passed through slots 13 in the side walls of the extension 3 and provided upon their outer ends with nuts 14, which may be screwed up to retain the feed-gage in its adjusted positions. Associated with this feed-gage and arranged in advance thereof is a vertically-movable feed-roller 15, extending entirely across the extension 3 above the apron (see Fig. 2) and having its ends received within upwardly-opening recesses 16 in the extension-walls. This roller is designed to rest upon the mass of material at a point directly in front of the feed-gage, so that when the quantity of material carried back by the apron is too great to permit its passage under the gage the accumulation of such material in advance of said gage will bear the weight of the roller imposed thereon. As the accumulation of material will naturally vary during the operation of the machine, it is necessary to provide for the vertical yielding of the roller. Its shaft 17 is therefore journaled at the free rear end of a swinging frame 18, comprising side arms 19 of angular form, hinged at their front ends to the opposite sides of the extension 3 and connected by a transverse bar 20. As the material accumulates in advance of the feed-gage the hinged mounting of the frame 18 will permit the roller to rise; but the weight of the roller being imposed upon the accumulation will insure the rearward feeding of the latter as rapidly as the dimensions of the feed-throat defined between the gage and apron will permit.

In handling material of different kinds it is desirable to vary the weight to be imposed upon the accumulated mass, and as it is impractical to employ rollers of different weights I have devised a simple form of tension-regulating mechanism designed to counterbalance the roller 15 to any desired extent. This tension device may be termed a "swinging counterbalance-frame" 21, comprising side bars 22 and 23, pivoted intermediate of their ends to the extension 3, preferably at a point in rear of the roller. These side bars extend forwardly below the side arms 19 of the frame 18, and their rear ends are connected by a cross-bar 24, carrying an adjustable counterweight 25, preferably mounted on a stem 26, carried by the bar and designed to be secured in its adjusted positions by a set-screw 27. The counterweight will tend to swing the frame 21 in a direction to lift the roller 15, and this tendency will be diminished or increased accordingly as the counterweight is adjusted toward or from the axis of the frame.

The material carried back to the machine by the feed-apron 4 is delivered to the upper side of a toothed threshing-cylinder 28, rotating at a comparatively low rate of speed in the direction of the arrow in Fig. 3. As the cylinder rotates the material is carried down between this cylinder and a second toothed threshing-cylinder 29, intermeshing with the cylinder 28 and rotating in an opposite direction at considerably higher speed. As the material passes over the cylinder 28 it is mashed into close contact therewith by a yielding feed-roller 30, journaled in the opposite side walls of a heavy metallic cover 31, disposed above both threshing-cylinders and hinged at its rear end, as indicated at 32, to the casing of the machine. This cover is mounted in the manner stated in order that it may yield vertically when the material passing between the cylinder 28 and the roller 30 is sufficient to support the combined weight of the roller and cover; but it will be observed that when this condition exists the material will be mashed against the cylinder with considerable force and will be matted thereon in a manner to facilitate its subsequent treatment. One feature of this treatment is the cutting or chopping of the heavier portions of the material—as, for instance, the stems of the vines or the stalks of the corn—immediately prior to the passage of the material between the two threshing-cylinders. This chopping or cutting of the material is effected by a swinging vine-cutter 33, similar to that described in my concurrent application and preferably having the form of a heavy plate located in an opening in the top wall of the cover 31 and provided with a series of cutting edges 34, disposed in line with the direction of movement of the vines passing around the cylinder 28. The plate 33 is hinged at its upper edge, as indicated at 35, and from said edge extends a horizontal guard 36, designed to prevent the vines from passing upwardly around the roller 30. As the material is fed back to the threshing mechanism it passes in the manner stated between the roller 30 and the threshing-cylinder 28 and having been mashed down upon the latter is brought into contact with the cutter 33. As the cutter is vibrated by the contact of the irregular mass of material with its cutting edges it will chop or sever the heavier portions of the material into short lengths to facilitate the threshing operation. In this condition the material will pass downwardly between the threshing-cylinders 28 and 29 (rotating in opposite directions and at different speeds, as stated) and will be thoroughly threshed, notwithstanding the fact that all of the teeth engaging the mass will be moving in the direction of movement thereof.

Below the cylinder 29 is located a toothed concave 37, from the front end of which (located directly below the interval between the cylinders) extends an incline 38, down which the threshed corn, peas, or the like and a certain quantity of the smaller chaff will gravitate and be deposited upon a shaking-screen 39, to be hereinafter described. The main body of the material will, however, be carried forwardly between the cylinder 29 and the concave, receiving a further threshing before being fed up the upwardly-inclined rear end 40 of the concave to the interior of what may be be termed a "dust-chamber" 41.

The dust-chamber 41 is formed in the upper front portion of the casing of the machine immediately in rear of the second threshing-cylinder, its rear wall being defined by a transversely-disposed guard-board 42, pendent from the top wall of the casing. The top wall of the dust-chamber 41 is foraminous, as indicated at 43, (see Figs. 2 and 3,) to permit the escape of dust and smaller particles of chaff. From the dust-chamber the mass of material will gravitate through an opening defined between the guard-board 42 and the rear end of the concave and will be caught by the teeth of an endless conveyer 44 and carried rearwardly up a fixed inclined separating-screen 45, together with the peas, corn, or the like fed to the lower end of the screen by the shaking motion of the incline 39. It will be noted, however, that while the initially-separated grains or kernels are carried back over the incline 45 with the main body of the material they will constitute an under stratum, which will readily drop through the screen with such other grains or kernels as may detach themselves from the mass during the travel thereof to the rear end of the machine.

The endless conveyer 44 is constructed and arranged in a manner similar to that shown in my application aforesaid, being mounted upon conveyer-rollers 46 and 47 and having its upper side passed over an idler 48. It will now be seen that the corn, pea-vines, or the like fed to the machine are thoroughly threshed and that the peas, kernels, grains, or the like are separated from the mass and precipitated, together with the lighter portions of the chaff, through the screen 45. I will therefore proceed now to the description of the mechanism for completing the separation by removing these lighter particles or chaff by subjecting the falling grains or kernels to the action of successive blasts of air and will then describe the manner in which the various movable elements of the machine are geared.

At the bottom of the machine below the screen 45 is mounted a shaking-shoe 49, rigidly connected by frame-bars 50, upstanding from its front end with the rear end of the shaking-incline 39 below the concave, the bars 50 being preferably integral with the frames of the incline and shoe, respectively. The incline and shoe thus connected constitute a shaking-frame supported from swinging hangers 51 and 52, connected to the front end of the incline 39 and to the rear end of the shoe, respectively, the hangers 52 being considerably longer than the hangers 51 in order that as the frame is moved back and forth it will be given that peculiar tilting motion essential to the feeding of the material along the surface of the incline.

Below the screen 45 and disposed substantially parallel therewith, so as to effect the forward gravitation of the seeds or kernels dropping thereon, is a shaking-incline 53, carried by standards 54, rigidly supported from the shoe. The incline 53 extends forwardly somewhat beyond the plane of the shoe 49 and is disposed to discharge at its front end upon the upwardly-curved forward extremity 55 of a shaking-screen 56, secured to the side walls of the shoe and upwardly inclined from its front end, but in less degree than the incline 53. Below the screen 56 is a third shaking-incline 57, preferably parallel with the screen 56 and likewise secured to the walls of the shoe. This incline 57 discharges at its front end into the front end of the shoe 49, and it will thus be obvious that the grains or kernels dropping upon the incline 53 from the screen 45 will be discharged first upon the front end of the screen 56, and being fed rearwardly thereover by the shaking of the frame will drop upon the incline 57 and gravitate from the front end thereof to the shoe 49 for delivery to the spout 58 in an obvious manner.

Located below the incline 39 is a fan-casing 59, having two spouts 60 and 61, both of which are directed rearwardly, the upper spout 60 to direct a blast of air over the incline 53 and the spout 61 to direct a second blast over the incline 57. A rotary fan or blower is located in the casing 59 and is rotated in a manner to be described. Thus it will be seen that the kernels, seeds, or grains will first gravitate down the incline 53 in the face of a rearwardly-directed blast which will remove the greater portion of the chaff and will then be subjected to another separative action by the screen 56 and traveling down the incline 57 will be subjected to a second blast of air, which will remove the remaining debris prior to delivery to the shoe.

Upstanding from the rear end of the shoe 49 is a hinged guard or blast-regulator 63, designed, according to its position, to obstruct in greater or less degree the second or lower blast in order that the force of the latter may be regulated in accordance with the material being treated, as it is obvious that since the inclination of the incline 57 is not considerable the unregulated blast would tend to blow back the lighter grains with the chaff.

The movement of the shaking-screen is effected by means of an eccentric-rod 65, connected to the eccentric of an eccentric-shaft 66.

The particular gearing employed for imparting the necessary movement to the various elements of the machine is not essential, but by preference the shaft $29^a$ of the cylinder 29 is utilized as the power-shaft and is provided with a power-pulley 67, geared, as by a belt or otherwise, to a suitable source of power. At the side of the machine opposite the power-pulley 67 the shaft $29^a$ is provided with a sprocket-wheel 68, geared by a sprocket-chain 69 to a somewhat larger sprocket-wheel 70, keyed or otherwise fixed on a shaft 71, extending transversely across the front of the frame. This shaft is in turn provided with a spur-pinion 72, meshing with a comparatively large gear-wheel 73 on one end of the shaft $28^a$ of the threshing-cylinder 28. It will be noted that this gearing effects the rotation of the cylinder 28 at a lower speed than that of the cylinder 29 and in an opposite direction. On the end of the shaft $28^a$ at the side of the machine opposite the gear-wheel is mounted a sprocket-wheel 74, geared by a chain 75 to a sprocket-wheel 76 on the shaft 7 of the roller 5, so that as the threshing-cylinders are rotated the feed-apron will be moved to advance the material toward the machine. Motion is transmitted from the shaft 71 to the endless conveyer 44 and eccentric-shaft 66 through a chain 77, passing around a sprocket 78 on the shaft 71 and a sprocket 79 on the shaft 46ª of the roller 46 and around a sprocket 80 on the eccentric-shaft 66. The blower-shaft 62ª is driven by a crossed belt 81, passed around pulleys 82 and 83 on the shafts 29ª and 62ª.

Briefly, the operation of the machine is as follows: The material to be threshed is fed upon the outer end of the apron 4 and is carried rearwardly under the roller 15 and gage 8 to the threshing mechanism, and if through irregularity in the feed the material passes back in too great a quantity to pass under the gage it will accumulate in advance of the latter and the accumulation will sustain the weight of the roller 15, the downward pressure of which will vary according to the adjustment of the counterweight 25. When the feed of material to the apron is diminished, the latter will gradually carry back the accumulated mass in front of the gage, being assisted in this operation by the roller, which constantly forces the mass down into contact with the apron to be caught by the rearwardly-moving fingers of the latter. Having passed the rear end of the apron, the material is caught by the cylinder 28 and is carried back under the feed-roller 30 and against the cutter 33, which latter serves to sever the heavier portions of the material immediately prior to the passage of the mass between the two threshing-cylinders moving in opposite directions and at different speeds. The threshing action serves to liberate a considerable quantity, if not practically all, of the corn, peas, or the like, and these are precipitated upon the incline 38 at the rear end of the concave and drop thence upon the shaking-incline 39, down which they are fed to the lower front end of the fixed separating-screen 45, connected to the incline 39 by a flexible connecting-strip 39ª. Having been subjected to the threshing action of the cylinders, the mass of material is carried rearwardly between the cylinder 29 and the concave 37 and is projected into the dust-chamber 41, where a considerable portion of the dust is liberated and escapes through the foraminous top 43 of the chamber. Passing downwardly through the bottom of the chamber 41, the material is caught by the teeth of the conveyer 44 and is carried back over the screen 45, sweeping with it the peas which have accumulated at the rear end of the incline 39. As the mass is carried toward the rear end of the machine by the conveyer 44 the grain, peas, or the like drop through the screen 45 into the range of the blast from the spout 60 and gravitate forwardly down the incline 53 in the face of the blast. A large percentage of the lighter debris is thus separated and blown out at the rear end of the machine, and the grains or kernels are directed to the screen 56, which effects a further separation and precipitates the material into the range of a second blast of air from the lower blower-spout 61, after which the thoroughly-separated product is delivered to the shoe 49 and passes from the machine by way of the spout.

It is thought that from the foregoing the construction and operation of my threshing-machine will be clearly apparent; but while the illustrated embodiment of the invention is believed at this time to be preferable I wish to be distinctly understood as reserving to myself the right to effect such changes, modifications, and variations of the illustrated structure as may be fairly embraced within the scope of the protection prayed.

What I claim is—

1. In a threshing-machine, the combination with a casing, and a pair of coacting threshing-cylinders located in substantially the same horizontal plane only one of said cylinders having a concave located thereunder, means for rotating said cylinders in opposite directions at different speeds, of an incline disposed to receive the corn, peas or the like precipitated from the mass of material as it passes between the cylinders and to direct the same toward the feed end of the machine.

2. In a threshing-machine, the combination with a casing, and front and rear coacting cylinders located in substantially the same horizontal plane, said rear cylinder only, having a concave located thereunder, of means for rotating said cylinders in opposite directions at different speeds, an incline extending downwardly from the front end of the concave and disposed to receive the corn, peas or the like separated from the material passing between the cylinders, a separating-screen, and means located beyond the rear cylinder for conveying the mass of material over the screen.

3. In a threshing-machine, the combination with a casing, and the front and rear threshing-cylinders located in substantially the same horizontal plane said rear cylinder only, having a concave located thereunder, of a separating-screen, a shaking-incline disposed to receive the corn, peas or the like liberated from the mass of material passing between the cylinders and for feeding the same to the screen, and a conveyer moving rearwardly over the screen and disposed to engage and convey the material passing rearwardly from the concave.

4. In a threshing-machine, the combination with a casing, a pair of threshing-cylinders located in substantially the same horizontal plane, the rear cylinder only having a concave located thereunder, to permit the corn, peas or the like, to drop from the interval between the cylinders without passing into the concave, of a dust-chamber disposed beyond the concave to receive the stalks, vines or the like, from the latter, a screen located beyond the dust-chamber, and a conveyer disposed to convey the material over the screen from the dust-chamber.

5. In a threshing-machine, the combination with a casing, separating mechanism comprising the front and rear threshing-cylinders, and a single concave located under the rear cylinder, of a dust-chamber located above and beyond the concave, an endless conveyer having its rear end disposed under the dust-chamber to engage the mass of material passing from the latter, and a separating-screen over which the material is carried by the conveyer.

6. In a threshing-machine, the combination with the casing, and the front and rear threshing-cylinders, of a concave disposed under the rear cylinder, a dust-chamber disposed to receive the material from the concave and having an open bottom, an endless conveyer disposed to engage the material passing through the bottom of the dust-chamber, a separating-screen over which the material is carried, and a shaking-incline arranged to receive the corn, peas or the like separated from the mass of material as they pass between the threshing-cylinders and to deliver the same to the lower end of the screen to be carried over the latter with the main body of the material.

7. In a threshing-machine, the combination with the casing, and the front and rear threshing-cylinders of a concave located under the rear cylinder and terminating at its front end directly below the interval between the cylinders, a fixed incline extending downwardly and forwardly from the front end of the concave, a shaking-incline disposed to receive the corn, peas or the like passing down the fixed incline, a dust-chamber in rear of the second cylinder, an upwardly and rearwardly inclined separating-screen disposed to receive the corn, peas, &c., from the shaking-incline, and an endless conveyer moving rearwardly over the separating-screen and having teeth arranged to engage the mass of material passing downwardly through the bottom of the dust-chamber.

8. In a threshing-machine, the combination with a casing, threshing mechanism, and a separating-screen, of a conveyer moving over the screen, a shoe, a pair of inclines located in different planes to successively receive the corn, peas or the like dropping through the separating-screen and downwardly inclined toward the feed end of the machine, and means for projecting separate blasts of air rearwardly over each of the inclines.

9. In a threshing-machine, the combination with a casing, threshing mechanism, a separating-screen, and a conveyer moving thereover, of a shoe, an incline disposed to receive the corn, peas or the like dropping from the screen, a second screen into the front end of which the incline discharges, a second incline located under the second screen and discharging into the front end of the shoe, and means for projecting separate blasts of air over each of the inclines.

10. In a threshing-machine, the combination with the threshing mechanism, a separating-screen, and a conveyer for conveying the material thereover from the threshing mechanism, of a shaking-incline located directly below the threshing mechanism and delivering upon the lower end of the screen, a shoe, a pair of inclines disposed between the separating-screen and shoe, a second screen between said inclines, and means for vibrating the shoe, the several inclines and the second screen in unison.

11. In a threshing-machine, the combination with the threshing mechanism, a separating-screen, and a conveyer for conveying the material thereover from the threshing mechanism, of a shaking-incline located directly below the threshing mechanism and delivering upon the lower end of the screen, a shoe, a pair of inclines disposed between the separating-screen and shoe, a second screen between said inclines, means for vibrating the shoe, the several inclines and the second screen in unison, and a blower having spouts directed to project blasts of air over each of the inclines located between the separating-screen and shoe.

12. In a threshing-machine, the combination with front and rear threshing-cylinders located in substantially the same horizontal plane and means for rotating said cylinders in opposite directions at different speeds, of a concave located under the rear cylinder only, a separating-screen in rear of the concave, a shaking-incline disposed to receive the corn, peas or the like liberated from the mass of material passing between the cylinders and to feed the same to the screen, a flexible connection closing the interval between the adjacent ends of the screen and incline to permit the shaking of the latter, and a conveyer moving rearwardly over the screen and disposed to carry back the mass of material and to cause said material to sweep the corn, peas and the like from the shaking-incline, and to carry them rearwardly over the screen.

In testimony that I claim the foregoing as my own I have hereto affixed my signature in the presence of two witnesses.

JOHN MARION BRASINGTON.

Witnesses:
R. N. SAMPSON,
D. D. McCOLL, Jr.